United States Patent [19]

Lim

[11] Patent Number: 4,604,513

[45] Date of Patent: Aug. 5, 1986

[54] COMBINATION OF A LASER AND A CONTROLLER FOR TRIMMING A METALLIZED DIELECTRIC FILM CAPACITOR

[76] Inventor: Basilio Y. Lim, 12931 Sunnyside Pl., Santa Fe Springs, Calif. 90670

[21] Appl. No.: 731,851

[22] Filed: May 7, 1985

[51] Int. Cl.[4] ............................................. B23K 26/00
[52] U.S. Cl. ...................... 219/121 LA; 219/121 LK; 372/38
[58] Field of Search .................. 219/121 LA, 121 LB, 219/121 LL, 121 LK, 121 LE, 121 LF, 121 L, 121 LM; 372/25, 26, 30, 38

[56] References Cited

U.S. PATENT DOCUMENTS

| | | | |
|---|---|---|---|
| 3,806,829 | 4/1974 | Duston et al. | 372/38 |
| 3,892,023 | 7/1975 | Warmont | 29/25.42 |
| 3,921,041 | 11/1975 | Stockman | 361/330 |
| 4,087,672 | 5/1978 | Yi | 219/121 LH |
| 4,169,251 | 9/1979 | Lackmann | 372/83 X |
| 4,286,250 | 8/1981 | Sacchetti | 338/306 |
| 4,348,714 | 9/1982 | Wallace | 361/328 |
| 4,441,008 | 4/1984 | Chan | 219/121 LL |
| 4,476,375 | 10/1984 | Doawa | 219/121 LW |
| 4,485,230 | 12/1984 | Yamamoto | 219/121 LM |
| 4,504,727 | 3/1985 | Melcher et al. | 219/121 LK X |

*Primary Examiner*—C. L. Albritton
*Attorney, Agent, or Firm*—W. Edward Johansen

[57] ABSTRACT

The present invention is a combination of a laser system and a controller for use in vaporizing the material of a metallized dielectric film capacitor to form a hole in order to trim its capacitance. The combination includes a laser system which has a laser modulator, a mechanical triggering device and a controller which includes a trigger/reset circuit which is electrically coupled to the mechanical triggering circuit and which provides a trigger signal in its triggered state and a reset signal in its untriggered state. The controller also includes a clock circuit which is electrically coupled to the trigger reset circuit and which provides clock signals in response to the trigger signal and a one-shot monostable, multivibrator circuit having an RC timing circuit which is electrically coupled to the clock circuit and to the laser modulator and which controls the pulse width of its output signal in response to the clock signals. The controller further includes a counter which is electrically coupled to the one-shot monostable, multivibrator circuit and which counts each of the clock signals and a comparator which is electrically coupled to the counter in order to compare the number of the counted clock signals to a selected number and which is electrically coupled to the clock circuit. When the number of the counted clock signal equals the selected number, the comparator provides a clock inhibit signal in order to inhibit the clock circuit from providing any more clock signals.

1 Claim, 4 Drawing Figures

COMBINATION OF A LASER AND A CONTROLLER FOR TRIMMING A METALLIZED DIELECTRIC FILM CAPACITOR

BACKGROUND OF THE INVENTION

1. Field of the Invention

The present invention relates to a method and appartus for accurately lowering the capacitance of a capacitor which is formed out of a pair of metallized dielectric film and more particularly to a laser and a controller are used to drill a plurality of a holes in a capacitor in order to trim its capacitance to an acceptable capacitance.

2. Description of the Prior Art

U.S. Pat. No. 3,892,023, entitled Process of Manufacturing a Capacitor Assembly, issued to George Warmont on July 1, 1975, teaches a method for making a capacitor assembly which is made up of any number of circular capacitors which are directly interconnected one to another while manufacturing is in progress, and the assembly thereof. A first capacitor is provided with adjacent plates thereof having their edges extending one beyond another. An insulating layer is wound around the first capacitor and a second capacitor is set on the layer. And so on until the wanted number of capacitors is reached. One side of the capacitor assembly, a mask is pushed into a recess provided at the edge of each insulating layer thereof. Both sides of the assembly are then metallized. The masks are removed leaving the required insulation between the various capacitors. The capacitor assembly may contain any number of capacitors, of the same or different capacitive values, in parallel or in series, housed in a single casing. U.S. Pat. No. 4,028,595, entitled, Multi-Voltage Capacitor Section, issued to Robert M. Stockman on June 7, 1977, teaches a method for making a multi-voltage capacitor. The method includes the steps of winding a single capacitor section in the usual manner from two metallized films and, after the winding has progressed through the proper number of turns for one of the capacitors, of removing the metallized layer from the surface of at least one film over a selected distance. The method also includes the steps of inserting an insulted sheet having a length sufficient to encircle the capacitor at least once between the film layer in order to extend beyond at least one end of the wound cylinder and of inserting the ends of two additional dielectric strips into the capacitor winding between the metallized films. The method further includes the steps of then completing the winding, of metal-plating each end of the wound section, and of attaching leads to the ends of the capacitor section resulting in a plurality of capacitor having different voltage ratings but wound within a single capacitor section. U.S. Pat. No. 3,921,041, entitled Dual Capacitor, issued to Robert M. Stockman on Nov. 18, 1975, teaches a dual metallized capacitor.

U.S. Pat. No. 4,348,714, entitled Multilayer Tubular Capacitor and Fabrication Thereof, issued to Clarence L. Wallace on Sept. 7, 1982, teaches a roll-up capacitor structure which is embodied by a carrier sheet and electrodes on the sheet. The electrodes have progressively increasing length along the sheet length dimension.

U.S. Pat. No. 3,921,041, entitled Multi-Section insulating sheet serves to blow molten metal out of the holes as they are formed and prevent metal from depositing on the metal plate around the holes.

U.S. Pat. No. 4,441,008, entitled Method of Drilling Ultrafine Channels through Glass, issued to Uck I. Chan on Apr. 3, 1984, teaches a method for generating ultrafine channels though and between opposed surfaces of a thin glass body by preheating the glass body to 500° F.-1000° F., and directing a beam of laser energy having a wavelength of at least about 10.6 microns along a fixed axis at the preheated body and against one of the surfaces for a period sufficient to melt and vaporize the portion of the glass in the path of the beam. The beam is defocused relative to the one surface and pulsed.

U.S. Pat. No. 4,286,250 also teaches an automatic system for producing laser formed resistor elements. The system includes a conventional X-Y positioner table which is mounted for two-dimensional movement in response to an X-direction servo drive motor and an Y-direction servo drive motor. Selective positioning of the table in response to the energization of the motors is provided by input signmals from a control unit. Positioned above the X-Y positioner table and also controlled selectively by the control unit is an argon laser. During use of the system a suitable plastic substrate is positioned on the table and moved thereby in a predetermined pattern with respect to a radiation beam produced by the argon laser. Impingement of the laser beam onto the substrate surface carburized resistor portions thereon having a pattern established by selective energization of the laser and movement of the table in accordance with the inputs from the control unit.

U.S. Pat. No. 4,476,375, entitled Process For Selective Cutting of Electrical Conductive Layer by Irradiation of Energy Beam, issued to Tsutomu Ogawa on Oct. 9, 1984, teaches a method for cutting an electrical conductive layer which has a heat-absorbing film deposited thereon by irradiating an energy beam on a portion of the electrical conductive layer intended to be cut. The energy beam is irradiated on the film so that the portion of the electrical conductive layer melts and alloys with the heat-absorbing film due to the energy absorbed and transferred by the heat-absorbing film.

U.S. Pat. No. 4,489,230, entitled Manufacturing Method for a Resistance Element, issued to Yutaka Yamamoto on Dec. 18, 1984, teaches a resistance element manufacturing method which forms on the surface of an electically insulating base layer including an organic material to be carbonized by irradiation of a laser beam. A laser beam transmitting electically insulating film is not carbonized by the irradiation of the laser beam. The laser beam is irradiated onto the base layer through the film from one side thereof so that it carbonizes the irradiated portion of the base layer in order to form a resistence layer.

U.S. Pat. No. 4,286,250, entitled Laser Formed Resistor Elements, issued to Peter J. Sacchetti on Aug. 25, 1981, teaches a laser formed resistor element which includes a body element having an organic substrate portion and a laser formed, resistor portion carburized thereon. A first electrical conductor is electrically connected to one location on the resistor portion so as to form one terminal for connection to an electrical circuit and a second electrical conductor is electrically connected to the resistor portion at a different location so as to form another terminal for connection to the electrical circuit.

U.S. Pat. No. 3,404,032, entitled Method of Making Film Resistor, issued to Franklin M. Collins on Oct. 1, 1968, teaches a method for adjusting the value of a resistor including a conductive film of thallium oxide dispersed in glass according to which the film is selectively heated in localized areas to render portions of the film comparatively non-conductive.

SUMMARY OF THE INVENTION

In view of the foregoing factors and conditions which are characteristic of the prior art it is the primary object of the present invention to provide a method and appartus for accurately lowering the capacitance of a capacitor which is formed out of a pair of metallized dielectric film.

It is another object of the present invention to provide a laser and a controller which are used to drill a plurality of a holes in a capacitor in order to trim its capacitance to an acceptable capacitance.

In accordance with the present invention an embodiment of a combination of a laser system and a controller for use in vaporizing the material of a metallized dielectric film capacitor to form a hole in order to trim its capacitance is described. The combination includes a laser system which has a laser modulator, a mechanical triggering device and a controller which includes a trigger/reset circuit which is electrically coupled to the mechanical triggering circuit and which provides a trigger signal in its triggered state and a reset signal in its untriggered state. The controller also includes a clock circuit which is electrically coupled to the trigger reset circuit and which provides clock signals in response to the trigger signal and a one-shot monostable, multivibrator circuit having an RC timing circuit which is electrically coupled to the clock circuit and to the laser modulator and which controls the pulse width of its output signal in response to the clock signals. The controller further includes a counter which is electrically coupled to the one-shot monostable, multivibrator circuit and which counts each of the clock signals and a comparator which is electrically coupled to the counter in order to compare the number of the counted clock signals to a selected number and which is electrically coupled to the clock circuit. When the number of the counted clock signal equals the selected number, the comparator provides a clock inhibit signal in order to inhibit the clock circuit from providing any more clock signals.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
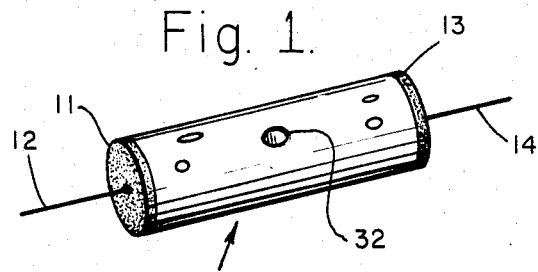
FIG. 1 is a perspective view of a capacitor the capacitance of which a laser and controller have lowered in accordance with the principles of the present invention.

In order to best understand the present invention it is necessary to refer to the following description of its preferred embodiment in conjunction with the accompanying drawing. Referring to FIG. 1 in conjunction with FIG. 2 a capacitor 10 has a first electrical contact 11 which is electrically coupled to a first lead wire 12 and a second electrical contact 13 which is electrically coupled to a second lead wire 14.

Figure 2:
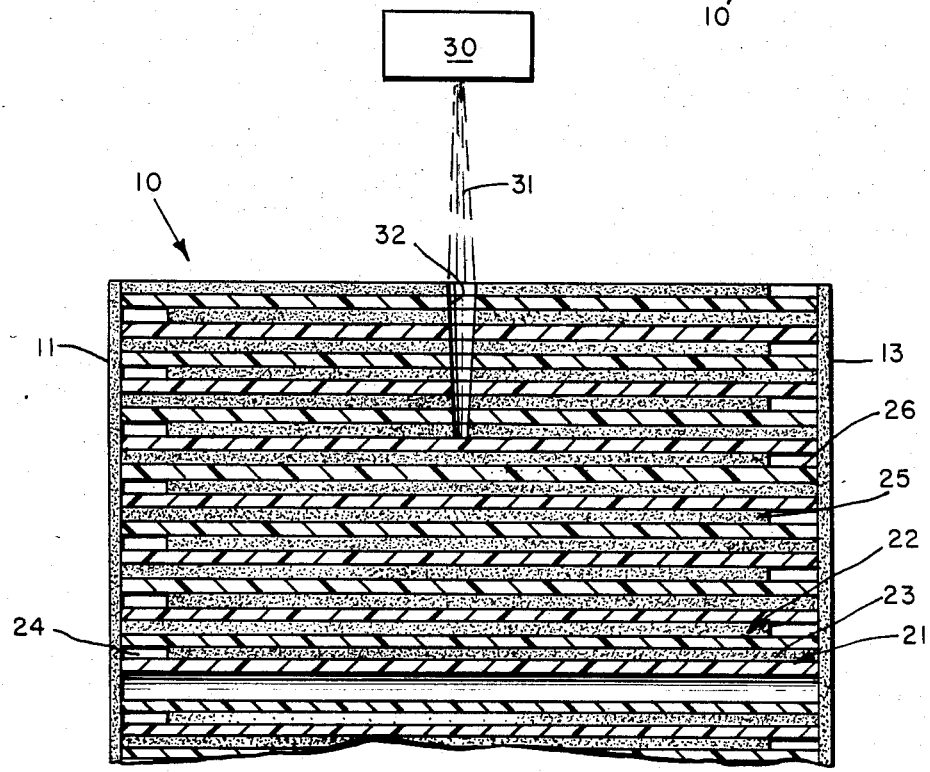
FIG. 2 is a partial elevational side view in cross-section of the capacitor of FIG. 1 after a beam of light energy has made a hole therein.

Referring to FIG. 1 in conjunction with FIG. 2 the capacitor 10 has a right end and a left end and is wound from a length of a first metallized dielectric film 21 and a second metallized dielectric film 22. The first metallized dielectric film 21 has disposed on its near surface a first thin metallized layer 23 which extends to its right edge but terminates short of its left edge thereby leaving a first non-metallized strip 24 therealong. The second metallized dielectric film 22 has disposed on its near surface a second thin metallized layer 25 which extends to its left edge but terminates short of its right edge thereby leaving a second non-metallized strip 26 therealong. The length of the first and second metallized dielectric films 21 and 22 are wound together in combination so that the first and second thin metalized layers 23 and 25 are separated by dieletric film. The first and second electrical contacts 11 and 13 make electrical contact with the first and second thin metalized layers 23 and 25, respectively, of the capacitor 10. The first and second electrical contacts 11 and 13 are disposed adjacent and are mechanically coupled to each of the right and left end, respectively, of the capacitor 10.

Still referring to FIG. 1 in conjunction with FIG. 2 a laser system 30 generates a beam of light energy 31 which vaporizes either a hole 32 or a plurality of holes in a number of sections of the first and second metallized dielectric films 21 and 22 in order to reduce the combined surface areas of both the first and second thin metalized layers 23 and 25 thereby lowering the capacitance of the capacitor 10.

Figure 3:
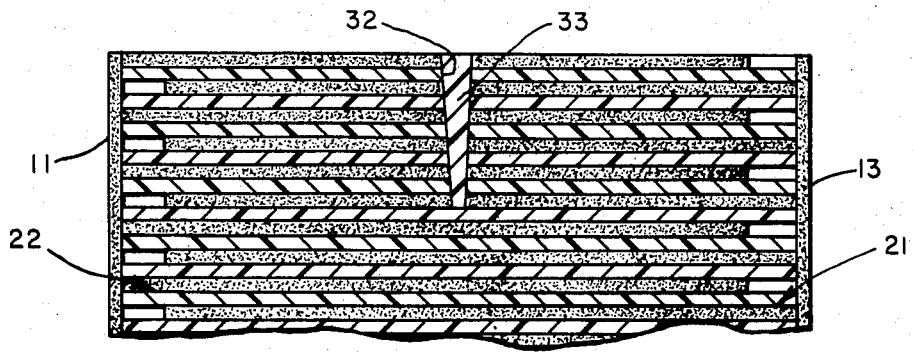
FIG. 3 is a partial elevational side view in cross-section of the capacitor of FIG. 1 after an epoxy resin has been used to fill the hole made by the beam of light energy. energy has made a hole therein.

Referring to FIG. 3 in conjunction with FIG. 2 either the hole 32 or the plurality of holes which the beam of light energy 31 has vaporized is filled with an epoxy resin 33 not only for the sake of its appearance, but also to protect the capacitor 10 from being shorted out.

Figure 4:
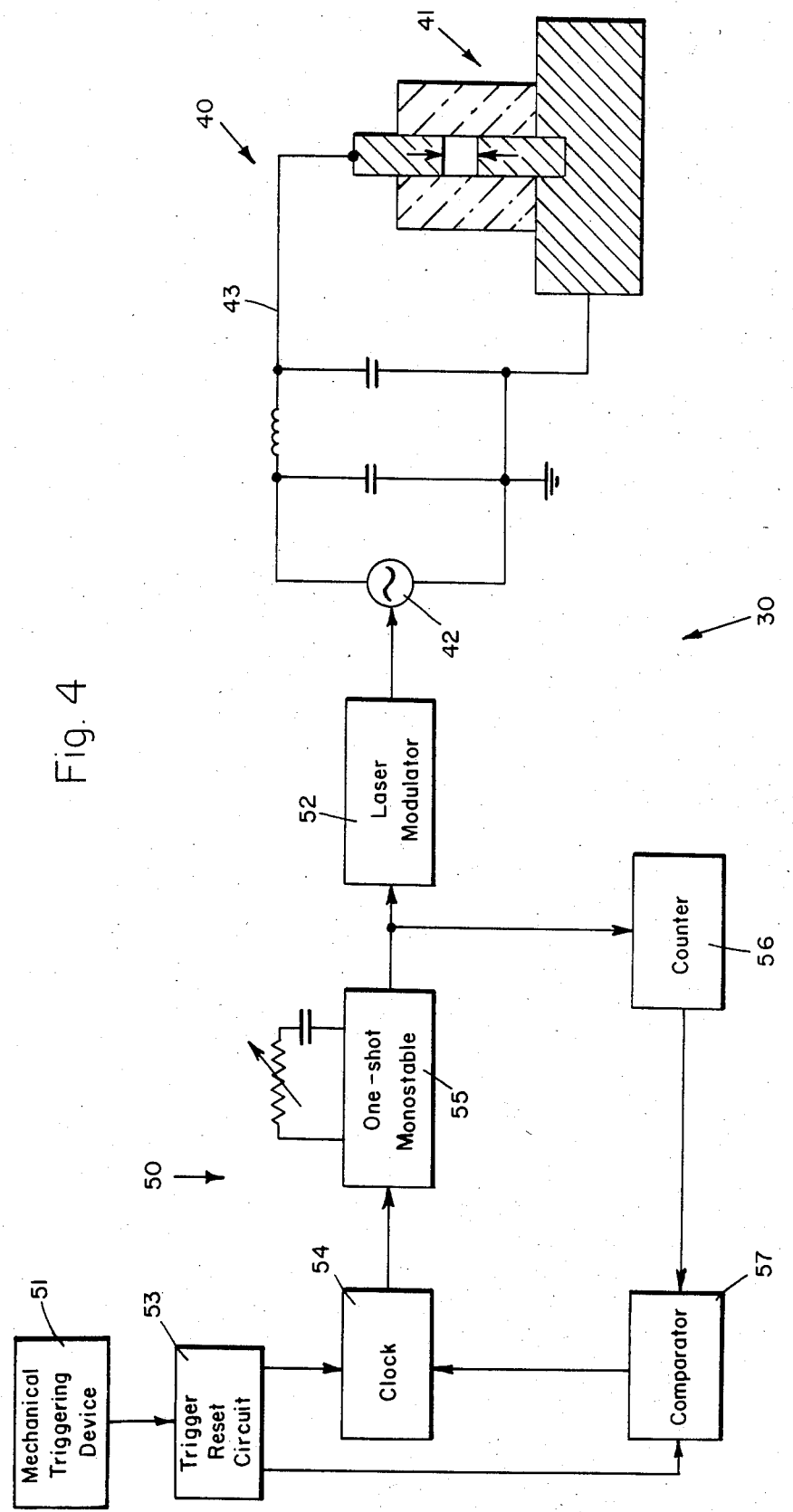
FIG. 4 is a schematic of a combination of a laser and a controller for use in trimming the capacitance of the capacitor of FIG. 1.

Referring to FIG. 4 laser system 40 includes a laser bore and electrode structure 41, a power supply 42 which is a radio frequency generator and a coaxial connector 43 which electrically couples the power supply 42 to the laser bore and electrode structure 41. U.S. Pat. No. 4,169,251, teaches Waveguide Gas Laser with High Freqency Transverse Discharge Excitation, issued to Katherine D. Laakman on Sept. 25, 1979, teaches the laser system 40.

Still referring to FIG. 4 an electronic controller 50 which may be used in combination with the laser system 40 to control the pulse width of a beam of light energy from the laser system 40 within a range of 0.005 seconds to 0.100 seconds and to limit the maximum number of pulses to any number which a user select. The electronic controller 50 includes a mechanical triggering device 51, a laser modulator 52 which turns the laser system 40 on and off at a frequency rate of two hundred cycles per second and a trigger/reset circuit 53 which is electrically coupled to the mechanical triggering device 51. The trigger/reset circuit 53 provides a trigger signal in its triggered state and a reset signal in its untriggered state. The electronic controller 50 also includes a clock circuit 54 which is electrically coupled to the trigger reset circuit 53 and which provides clock signals in response to the trigger signal and a one-shot monostable, multivibrator circuit 55 having an RC timing circuit which is electrically coupled to the clock circuit 54 and which controls the pulse width of its output signal in a range of 0.005 seconds and 0.1 seconds in response to the clock signals. The electronic controller 50 further includes a counter 56 which is electrically coupled to the one-shot monostable, multivibrator circuit 55 and which counts each of the clock signals and a comparator 57 which is electrically coupled to the counter 56 in order to compare the number of the counted clock signals to a selected number and which is electrically coupled to the clock circuit 54, so that, when the number of the counted clock signal equals the selected number, the comparator 57 provides a clock inhibit signal in order to inhibit the clock circuit 54 from providing any more clock signals.

From the foregoing it can be seen that a combination of a laser and a controller for use in vaporizing the material of a metallized dielectric film capacitor to form a hole in order to trim its capacitance has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A combination of a laser system and a controller for use in vaporizing the material of a capacitor, which is formed from a pair of metallized dielectric films, to form a hole in order to trim the capacitance of said capacitor, said combination comprising:
    a. a laser system including a laser modulator which turns said laser system on and off at a freqency rate of two hundred cycles per second; and
    b. a controller including a mechanical triggering device, a trigger/reset circuit which is electrically coupled to said mechanical triggering circuit and which provides a trigger signal in its triggered state and a reset signal in its untriggered state, a clock circuit which is electrically coupled to said trigger reset circuit and which provides clock signals in response to said trigger signal, a one-shot monostable, multivibrator circuit having an RC timing circuit which is electrically coupled to said clock circuit and to said laser modulator and which controls the pulse width of its output signal in a range of 0.005 seconds and 0.1 seconds in response to the clock signals, a counter which is electrically coupled to said one-shot monostable, multivibrator circuit and which counts each of said clock signals and a comparator which is electrically coupled to said counter in order to compare the number of said counted clock signals to a selected number and which is electrically coupled to said clock circuit, so that, when the number of said counted clock signal equals the selected number, said comparator provides a clock inhibit signal in order to inhibit said clock circuit from providing any more clock signals.

* * * * *